US009555836B2

(12) United States Patent
Yamamoto et al.

(10) Patent No.: US 9,555,836 B2
(45) Date of Patent: Jan. 31, 2017

(54) VEHICLE SIDE STRUCTURE

(71) Applicant: TOYOTA JIDOSHA KABUSHIKI KAISHA, Toyota-shi (JP)

(72) Inventors: Yohei Yamamoto, Nagoya (JP); Koui Hata, Toyota (JP); Yujiro Kaji, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/916,645

(22) PCT Filed: Sep. 15, 2014

(86) PCT No.: PCT/IB2014/001825
§ 371 (c)(1),
(2) Date: Mar. 4, 2016

(87) PCT Pub. No.: WO2015/040465
PCT Pub. Date: Mar. 26, 2015

(65) Prior Publication Data
US 2016/0194032 A1 Jul. 7, 2016

(30) Foreign Application Priority Data

Sep. 17, 2013 (JP) ................................. 2013-192126

(51) Int. Cl.
*B62D 25/02* (2006.01)
*B62D 25/04* (2006.01)
*B62D 21/15* (2006.01)
(52) U.S. Cl.
CPC ............. *B62D 25/025* (2013.01); *B62D 21/15* (2013.01); *B62D 25/04* (2013.01)

(58) Field of Classification Search
CPC ...... B62D 21/152; B62D 25/025; B62D 25/04
(Continued)

(56) References Cited

U.S. PATENT DOCUMENTS 4,944,553 A * 7/1990 Medley ................ B62D 25/025
296/203.03
6,053,564 A 4/2000 Kamata et al.
(Continued)

FOREIGN PATENT DOCUMENTS

AU 2013/384023 A1 10/2015
DE 102014114102 A1 * 3/2016
(Continued)

OTHER PUBLICATIONS

International Search Report Issued Feb. 17, 2015 in PCT/IB14/01825 Filed Sep. 14, 2014.

*Primary Examiner* — Jason S Morrow
(74) *Attorney, Agent, or Firm* — Oblon, McClelland, Maier & Neustadt, L.L.P.

(57) ABSTRACT

In a vehicle, a gusset is provided at a lower end portion of a front pillar, a body wall portion of the gusset is joined to the front pillar, and a bottom wall portion of the gusset is joined to an upper wall portion of a rocker outer reinforcement. Thus, when the front pillar is about to collapse rearward, the upper wall portion supports the bottom wall portion of the gusset from below the vehicle. Therefore, the front pillar is restrained from collapsing. Besides, the rocker outer reinforcement receives, on a surface thereof, a load input from the gusset. Therefore, the load input to the rocker outer reinforcement is dispersed, so the load can be restrained from concentrating.

13 Claims, 9 Drawing Sheets

(58) Field of Classification Search
USPC .............. 296/187.1, 193.06, 203.03, 193.05
See application file for complete search history.

(56) References Cited

U.S. PATENT DOCUMENTS

| | | | | |
|---|---|---|---|---|
| 6,217,109 | B1 | 4/2001 | Okama et al. | |
| 6,679,547 | B2* | 1/2004 | Ju-Sik .................... | B62D 25/04 296/203.03 |
| 2003/0102697 | A1* | 6/2003 | Yakata ................... | B62D 25/02 296/209 |
| 2015/0344071 | A1* | 12/2015 | Nakano .................. | B62D 25/04 296/187.09 |
| 2016/0016612 | A1* | 1/2016 | Torikawa ............. | B62D 25/025 280/784 |
| 2016/0082814 | A1* | 3/2016 | Mori ...................... | B62D 25/04 296/146.11 |

FOREIGN PATENT DOCUMENTS

| | | |
|---|---|---|
| JP | 10-059218 A | 3/1998 |
| JP | 11-342869 A | 12/1999 |
| JP | 2000-219150 A | 8/2000 |
| JP | 2008-189137 A | 8/2008 |
| JP | 2009-061991 A | 3/2009 |
| JP | 2013-1226 A | 1/2013 |
| JP | 2013-169823 A | 9/2013 |
| WO | 2014/155538 A1 | 10/2014 |

\* cited by examiner

VEHICLE SIDE STRUCTURE

BACKGROUND OF THE INVENTION

1. Field of the Invention

The invention relates to a vehicle side structure around a front end portion of a rocker.

2. Description of Related Art

In the case where a vehicle undergoes a frontal collision (so-called a small overlap collision) with a collision body in a region outside a front side member in a vehicle width direction, a front wheel that has moved rearward in the vehicle front-rear direction hits a front pillar and a front end portion of a rocker, so the front pillar is about to collapse rearward in the vehicle front-rear direction.

In contrast, with a lateral vehicle body structure for a vehicle described in Japanese Patent Application Publication No. 2013-001226 (JP-2013-001226 A), a first reinforcement member (a gusset) is provided inside a lower end portion of a front pillar. Therefore, the front pillar is restrained from collapsing at the time of a small overlap collision. Incidentally, related vehicle side structures are described in, for example, Japanese Patent Application Publication No. 11-342869 (JP-11-342869 A) and Japanese Patent Application Publication No. 10-059218 (JP-10-059218 A).

However, with the aforementioned lateral vehicle body structure for the vehicle, when the front pillar collapses rearward in the vehicle front-rear direction, a moment is generated in the first reinforcement member, and a downward load with respect to the vehicle is input to a rocker from a lower end portion at a rear end portion of the first reinforcement member. Therefore, the load input from the first reinforcement member to the rocker concentrates, and the rocker may bend (the cross-section thereof may collapse).

SUMMARY OF THE INVENTION

The invention provides a vehicle side structure that can restrain a rocker from deforming while restraining a front pillar from collapsing at the time of a small overlap collision.

A vehicle side structure according to one aspect of the invention is equipped with a rocker, a front pillar, and a gusset. The rocker extends in a vehicle front-rear direction on each of both sides of a vehicle lower portion in a vehicle width direction, and the rocker includes a closed cross-section that is constituted by a rocker outer reinforcement and a rocker inner panel, and the rocker outer reinforcement includes side wall portion, an upper wall portion and a lower wall portion. The front pillar extends upward in the vertical direction of the vehicle from a front end portion of the rocker. The gusset is provided at a lower end portion of the front pillar, and the gusset includes a body wall portion, the vehicle width direction being coincident with a thickness direction of the body wall portion c and the body wall portion being joined to the front pillar, and the gusset includes a bottom wall portion that is bent inward in the vehicle width direction at a lower end portion of the body wall portion the bottom wall portion being joined to an upper face of the upper wall portion of the rocker outer reinforcement.

With the vehicle side structure, the rocker is provided on each of both the sides of the vehicle lower portion in the vehicle width direction. The rocker extends in the vehicle front-rear direction. Besides, the rocker includes the closed cross-section that is constituted by the rocker outer reinforcement and the rocker inner panel, and the rocker outer reinforcement includes the side wall portion, the upper wall portion, and the lower wall portion. Furthermore, the front pillar extends upward in the vertical direction of the vehicle from the front end portion of the rocker.

By the way, at the time of a small overlap collision of the vehicle, a front wheel moves rearward in the vehicle front-rear direction, and hits the front end portion of the rocker and the front pillar. Then, when the front wheel hits the front pillar, the front pillar is about to collapse rearward in the vehicle front-rear direction. Thus, when a small overlap collision occurs on the left side of the vehicle, a clockwise moment as viewed from the left side of the vehicle (when a small overlap collision occurs on the right side of the vehicle, a counterclockwise moment as viewed from the right side of the vehicle) is generated in the front pillar.

It should be noted herein that the gusset is provided at the lower end portion of the front pillar. This gusset includes the body wall portion that is arranged such that the thickness direction of the body wall portion is coincident with the vehicle width direction, and the gusset includes the bottom wall portion that is bent inward in the vehicle width direction at the lower end portion of the body wall portion. Then, the body wall portion is joined to the front pillar, and the bottom wall portion is joined to the upper face of the upper wall portion of the rocker outer reinforcement.

Thus, when the front pillar is about to collapse rearward in the vehicle front-rear direction at the time of a small overlap collision, a downward load in the vertical direction of the vehicle (a moment load) is applied from the bottom wall portion of the gusset to the upper wall portion of the rocker outer reinforcement, due to the aforementioned moment. At this time, the upper wall portion of the rocker outer reinforcement supports the bottom wall portion of the gusset from below the vehicle, so the front pillar 40 is restrained from collapsing rearward in the vehicle front-rear direction.

Besides, the rocker outer reinforcement receives, on a surface thereof, a load input from the bottom wall portion of the gusset. Therefore, the load input to the rocker outer reinforcement is dispersed, and the load can be restrained from concentrating on the rocker outer reinforcement. Thus, the rocker can be restrained from bending (the cross-section thereof can be restrained from collapsing).

Furthermore, the bottom wall portion of the gusset is bent inward in the vehicle width direction at the lower end portion of the body wall portion. Therefore, a ridgeline of a boundary region between the bottom wall portion and the body wall portion extends in the vehicle front-rear direction. Thus, a rearward collision load in the vehicle front-rear direction, which is input to the front pillar, is transmitted rearward in the vehicle front-rear direction through the ridgeline. As a result, the rocker can be restrained from buckling in the vehicle front-rear direction.

Owing to the foregoing, while the front pillar is restrained from collapsing at the time of a small overlap collision of the vehicle, the rocker can be restrained from deforming.

According to the vehicle side structure, while the front pillar is restrained from collapsing at the time of a small overlap collision of the vehicle, the rocker can be restrained from deforming.

In the vehicle side structure, the bottom wall portion of the gusset may be inclined downward in the vertical direction of the vehicle, outward in the vehicle width direction in a front view of the vehicle.

With the vehicle side structure, the bottom wall portion of the gusset is inclined downward in the vertical direction of the vehicle, as the bottom wall portion extends outward in the vehicle width direction in a front view. Therefore, the angle formed by the body wall portion and the bottom wall portion of the gusset is set as an acute angle. Therefore, a downward load in the vertical direction of the vehicle, which is input from the bottom wall portion of the gusset to the upper wall portion of the rocker outer reinforcement, is applied in the direction of inclination of the bottom wall portion of the gusset as well. That is, this load is also applied in such a direction as to shear an overlapping region of the bottom wall portion of the gusset and the upper wall portion of the rocker outer reinforcement in the direction of inclination of the bottom wall portion of the gusset. Thus, the rocker can be more restrained from bending (the cross-section thereof can be more restrained from collapsing) than in the case where the bottom wall portion of the gusset is arranged horizontally.

Besides, as described above, the angle formed by the body wall portion and the bottom wall portion of the gusset is set at an acute angle. Therefore, the load transmitted through the ridgeline of the boundary region between the body wall portion and the bottom wall portion can be made larger than in the case where the angle formed by the body wall portion and the bottom wall portion is set at a right angle. Thus, a rearward collision load in the vehicle front-rear direction, which is input to the gusset (the front pillar), can be efficiently transmitted rearward in the vehicle front-rear direction. As a result, the rocker can be further restrained from buckling in the vehicle front-rear direction.

According to the vehicle side structure, the rocker can be further restrained from deforming.

In the vehicle side structure, an outer face of the body wall portion of the gusset in the vehicle width direction and an outer face of the side wall portion of the rocker outer reinforcement in the vehicle width direction may be arranged in a same plane.

With the vehicle side structure, a downward load in the vertical direction of the vehicle, which is input from the gusset to the rocker outer reinforcement, is efficiently transmitted to the side wall portion of the rocker outer reinforcement. As a result, this load is transmitted to the lower wall portion as well through the side wall portion of the rocker outer reinforcement, so the front pillar can be further restrained from collapsing. Moreover, the side wall portion extends in the vertical direction of the vehicle in a front view. Therefore, this load can be received by the side wall portion, which exhibits high bending rigidity for the downward load in the vertical direction of the vehicle. Thus, the rocker can be further restrained from bending.

According to the vehicle side structure, while the front pillar is further restrained from collapsing, the rocker can be further restrained from deforming.

In the vehicle side structure, a front reinforcement member that reinforces the rocker outer reinforcement may be provided inside a front end portion of the rocker, and the front reinforcement member may support a rear end portion of the bottom wall portion of the gusset together with the upper wall portion of the rocker outer reinforcement.

With the vehicle side structure, the front reinforcement member supports the rear end portion of the bottom wall portion of the gusset together with the upper wall portion of the rocker outer reinforcement. Thus, the rocker can be effectively restrained from bending at the front end portion thereof.

That is, as described above, when the front pillar is about to collapse rearward in the vehicle front-rear direction at the time of a small overlap collision, a clockwise moment as viewed from the left side of the vehicle (a counterclockwise moment as viewed from the right side of the vehicle) is applied to the gusset. Therefore, the load (the moment load) that is applied from the bottom wall portion of the gusset to the upper wall portion of the rocker outer reinforcement increases rearward in the vehicle front-rear direction. In contrast, with the vehicle side structure, the front reinforcement member supports the rear end portion of the bottom wall portion together with the upper wall portion of the rocker outer reinforcement. Therefore, the large load input to the upper wall portion of the rocker outer reinforcement can be received by the front reinforcement member as well. Thus, the rocker can be effectively restrained from bending at the front end portion thereof.

According to the vehicle side structure, the rocker can be effectively restrained from deforming at the front end portion thereof.

In the vehicle side structure, a corner portion that constitutes an angle portion of a door opening portion may be formed at a lower end portion of the front pillar, a joint area joining the front pillar and the rocker to each other may be set at a terminal end portion of the corner portion, a rear reinforcement member that reinforces the rocker outer reinforcement may be provided inside the rocker, at a position rearward in the vehicle front-rear direction with respect to the front reinforcement member, and the rear reinforcement member may be arranged downward in the vertical direction of the vehicle with respect to the joint area.

With the vehicle side structure, the rear reinforcement member is provided inside the rocker. Then, the rear reinforcement member is arranged downward in the vertical direction of the vehicle with respect to the joint area joining the front pillar and the rocker to each other, which is set at the terminal end portion of the corner portion of the door opening portion, with respect to the vehicle. Thus, the bending position of the rocker at the time of a small overlap collision can be set as a position rearward in the vehicle front-rear direction with respect to the terminal end portion of the corner portion of the front pillar. As a result, the amount of rearward movement of the front pillar in the vehicle front-rear direction at the time of a small overlap collision can be reduced.

That is, in the case where the front pillar and the rocker are reinforced by the gusset and the front reinforcement member, a large moment is generated at the terminal end portion of the aforementioned corner portion. In contrast, with the vehicle side structure, the rear reinforcement member is arranged downward in the vertical direction of the vehicle with respect to the joint area where the front pillar and the rocker are joined to each other, which is set at the terminal end portion of the corner portion, with respect to the vehicle. Therefore, the terminal end portion of the corner portion is supported by the rear reinforcement member. Therefore, the moment load resulting from the aforementioned moment can be received by the rear reinforcement member. Thus, the rocker is restrained from bending at the terminal end portion of the corner portion, and the bending position of the rocker is set as a position rearward in the vehicle front-rear direction with respect to the terminal end portion of the corner portion. As a result, the amount of rearward movement of the front pillar in the vehicle front-rear direction at the time of a small overlap collision can be reduced.

According to the vehicle side structure, the amount of rearward movement of the front pillar in the vehicle front-rear direction at the time of a small overlap collision can be reduced.

In the vehicle side structure, a region where the rocker and the front pillar are joined to each other may serve as a joint portion in the joint area, and the rear reinforcement member may be arranged rearward in the vehicle front-rear direction with respect to the joint portion.

With the vehicle side structure, the rear reinforcement member is arranged rearward in the vehicle front-rear direction with respect to the joint portion in the joint area. Therefore, the moment load generated at the terminal end portion of the corner portion of the front pillar can be transmitted to the rear reinforcement member by the joint portion as well. Thus, the rocker can be effectively restrained from bending at the terminal end portion of the corner portion.

According to the vehicle side structure, the rocker can be effectively restrained from deforming at the terminal end portion of the corner portion.

In the vehicle side structure, a fragile portion that serves as a starting point of deformation in response to a rearward load in the vehicle front-rear direction may be formed at a rear end portion of the body wall portion of the gusset.

With the vehicle side structure, when a rearward collision load in the vehicle front-rear direction is applied to the gusset at the time of a small overlap collision, the gusset deforms in such a manner as to collapse rearward in the vehicle front-rear direction with the fragile portion serving as a starting point. Therefore, the collision load input to the gusset is absorbed by deformation of the gusset. Therefore, the moment load input to the rocker outer reinforcement can be reduced.

According to the vehicle side structure, the moment load input to the rocker outer reinforcement can be reduced.

In the vehicle side structure, the front reinforcement member may connect the upper wall portion with the lower wall portion of the rocker outer reinforcement to each other.

With the vehicle side structure, the front reinforcement member connects the upper wall portion of the rocker outer reinforcement with the lower wall portion of the rocker outer reinforcement to each other. Therefore, the upper wall portion and the lower wall portion of the rocker outer reinforcement can be supported in the vertical direction of the vehicle by the front reinforcement member. Thus, the rocker can be further restrained from deforming at the front end portion thereof.

According to the vehicle side structure, the rocker can be further restrained from deforming at the front end portion thereof.

In the vehicle side structure, the front reinforcement member may be constituted of a pair of bulk members that are aligned with each other in the vehicle front-rear direction, and the rear end portion of the bottom wall portion of the gusset may be arranged between the pair of the bulk members in a side view.

With the vehicle side structure, the front reinforcement member is constituted of the pair of the bulk members that are aligned with each other in the vehicle front-rear direction, and the rear end portion of the bottom wall portion of the gusset is arranged between the pair of the bulk members in a side view. That is, the rear end portion of the bottom wall portion of the gusset is supported by the pair of the bulk members. Therefore, for example, the weight of the vehicle can be made lighter than in the case where the front reinforcement member is configured to continuously support the gusset along the vehicle front-rear direction. Besides, for example, in the case where the joint portion of the gusset and the upper wall portion of the rocker outer reinforcement is located between the pair of the bulk members, the front reinforcement member can be arranged in such a manner as to avoid this joint portion.

According to the vehicle side structure, the weight of the vehicle can be reduced, and the degree of freedom in arranging the pair of the bulk members can be enhanced.

In the vehicle side structure, the joint portion of the joint area may be arranged between the front reinforcement member and the rear reinforcement member in a side view.

With the vehicle side structure, the joint portion of the joint area, which is set at the terminal end portion of the corner portion, is arranged between the front reinforcement member and the rear reinforcement member in a side view. Therefore, for example, the weight of the vehicle can be made lighter than in the case where the front reinforcement member and the rear reinforcement member are configured to continuously support the gusset and the corner portion along the vehicle front-rear direction. Besides, for example, in the case where another member or the like is located between the front reinforcement member and the rear reinforcement member, the rear reinforcement member can be arranged in such a manner as to avoid this member or the like.

According to the vehicle side structure, the weight of the vehicle can be reduced, and the degree of freedom in arranging the front reinforcement member and the rear reinforcement member can be enhanced.

In the vehicle side structure, an upper flange portion and a lower flange portion that extend rearward in the vehicle front-rear direction may be formed on the front reinforcement member or the rear reinforcement member, and the upper flange portion and the lower flange portion may be joined to the upper wall portion of the rocker outer reinforcement and the lower wall portion of the rocker outer reinforcement respectively.

With the vehicle side structure, the upper flange portion and the lower flange portion that extend rearward in the vehicle front-rear direction are formed on the front reinforcement member or the rear reinforcement member. Therefore, the upper flange portion and the lower flange portion are arranged in such a manner as to resist the moment applied to the rocker outer reinforcement. Thus, the shape of the front reinforcement member or the rear reinforcement member can be made effective from the standpoint of restraining the rocker from bending.

According to the vehicle side structure, the shape of the front reinforcement member or the rear reinforcement member can be made effective from the standpoint of restraining the rocker from bending.

In the vehicle side structure, an upper reinforcement member that extends in the vehicle front-rear direction may be provided between the front reinforcement member and the upper wall portion of the rocker outer reinforcement, and the upper reinforcement member may be provided between the rear reinforcement member and the upper wall portion of the rocker outer reinforcement.

With the vehicle side structure, the upper reinforcement member is provided between the front reinforcement member and the upper wall portion of the rocker outer reinforcement and the upper reinforcement member is provided between the rear reinforcement member and the upper wall portion of the rocker outer reinforcement, and the upper reinforcement member extends in the vehicle front-rear direction. Thus, the front reinforcement member and the rear reinforcement member can be connected to each other by the upper reinforcement member. Besides, the upper wall portion of the rocker outer reinforcement is reinforced by the upper reinforcement member as well. Thus, the bending rigidity of the rocker at the front end portion thereof can be enhanced.

According to the vehicle side structure, the bending rigidity of the rocker at the front end portion thereof can be enhanced.

In the vehicle side structure, the upper reinforcement member may be formed in a shape of a long plate whose thickness direction is coincident with a vertical direction of the vehicle, and a bend portion that is bent downward in the vertical direction of the vehicle may be formed at at least one of both end portions of the upper reinforcement member in the vehicle width direction.

With the vehicle side structure, the bend portion that is bent downward in the vertical direction of the vehicle is formed at at least one of both the end portions of the upper reinforcement member in the vehicle width direction. Therefore, the bending rigidity of the upper reinforcement member can be enhanced. As a result, the bending rigidity of the rocker at the front end portion thereof can be further enhanced.

According to the vehicle side structure, the bending rigidity of the rocker at the front end portion thereof can be further enhanced.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Figure 1:
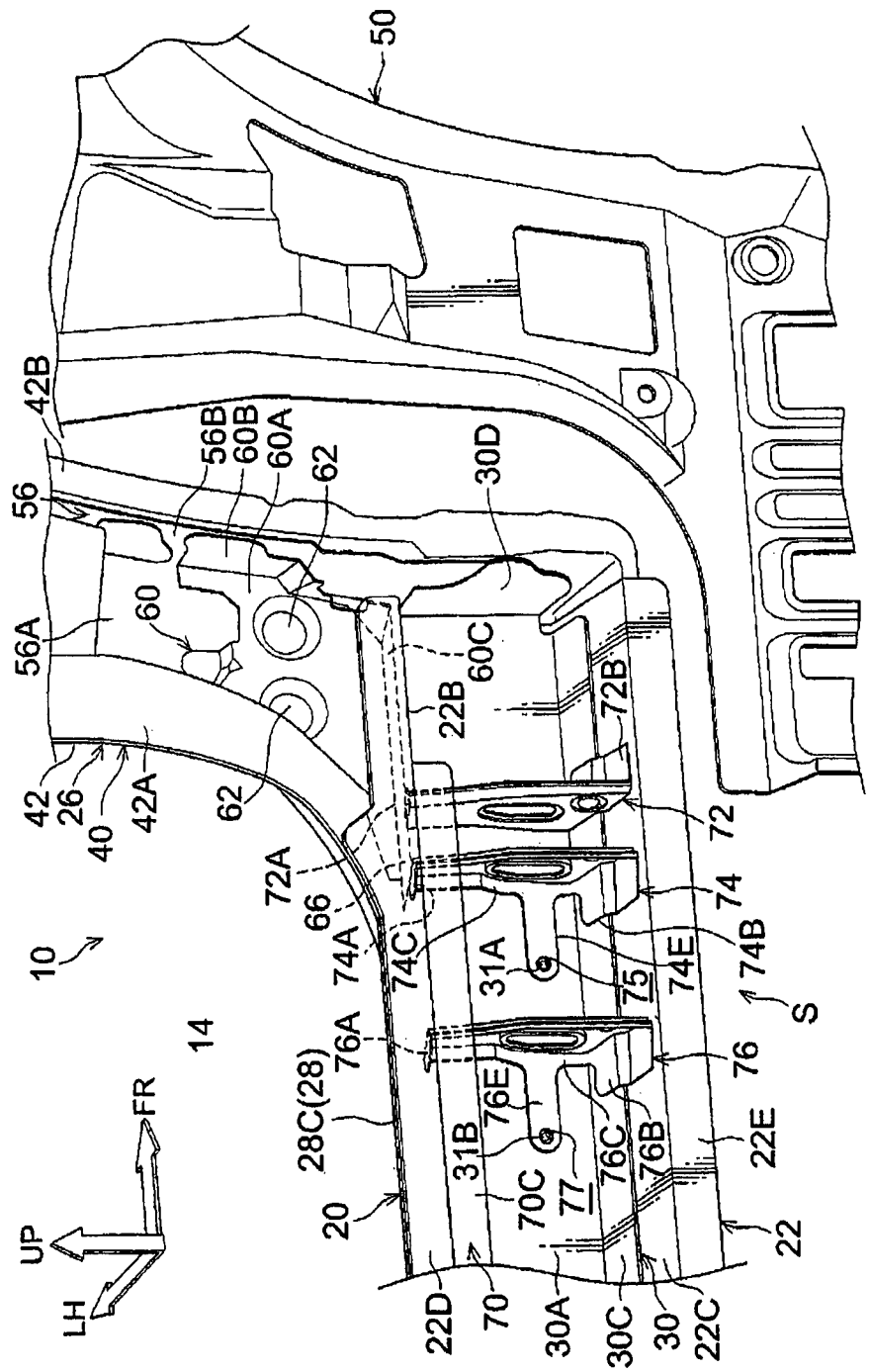
FIG. 1 is a schematic partially exploded perspective view showing a front end portion of a rocker and a lower end portion of a front pillar in a vehicle to which a vehicle side structure according to the present embodiment of the invention is applied, as viewed from inside in a vehicle width direction.

Hereinafter, a vehicle (an automobile) 10 to which a vehicle side structure S according to the embodiment of the invention is applied will be described based on the drawings. Incidentally, an arrow FR that is depicted in the drawings as appropriate denotes a forward direction with respect to the vehicle, an arrow LH denotes a leftward direction with respect to the vehicle (one side in a vehicle width direction), and an arrow UP denotes an upward direction with respect to the vehicle. Besides, the vehicle side structure S is applied to a region behind a front wheel 12 of the vehicle 10 with respect to the vehicle. The right vehicle side structure S and the left vehicle side structure S are configured symmetrically to each other in a vehicle width direction. Therefore, a vehicle left region of the vehicle 10 will be described, and the description of a vehicle right region of the vehicle 10 will be omitted.

Figure 2:
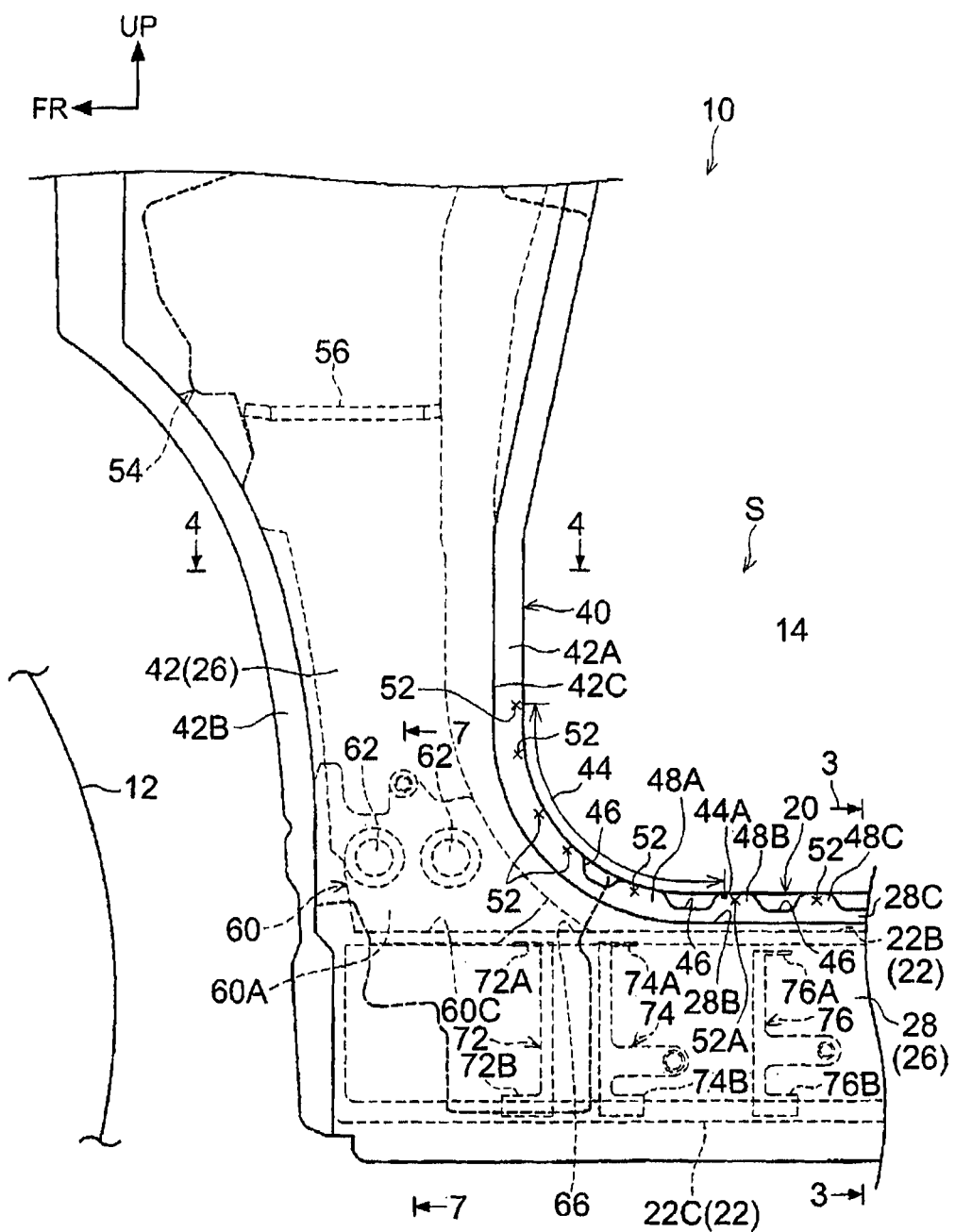
FIG. 2 is a schematic side view of the front end portion of the rocker and the lower end portion of the front pillar shown in FIG. 1, as viewed from outside in the vehicle width direction.

FIG. 2 is a side view showing the vehicle left region of the vehicle 10 to which the vehicle side structure S is applied. The vehicle 10 is configured to include a rocker 20 that extends in a vehicle front-rear direction at a lower portion on each of both sides in the vehicle width direction of the vehicle 10, and a front pillar 40 that extends upward in the vertical direction of the vehicle from a front end portion of the rocker 20. This rocker 20 and this front pillar 40 are closed cross-sectional members that constitute a vehicle body frame. The rocker 20 and the front pillar 40 form a door opening portion 14 through which a passenger gets on/off the vehicle, together with a roof side rail (not shown) and a center pillar (not shown).

Figure 3:
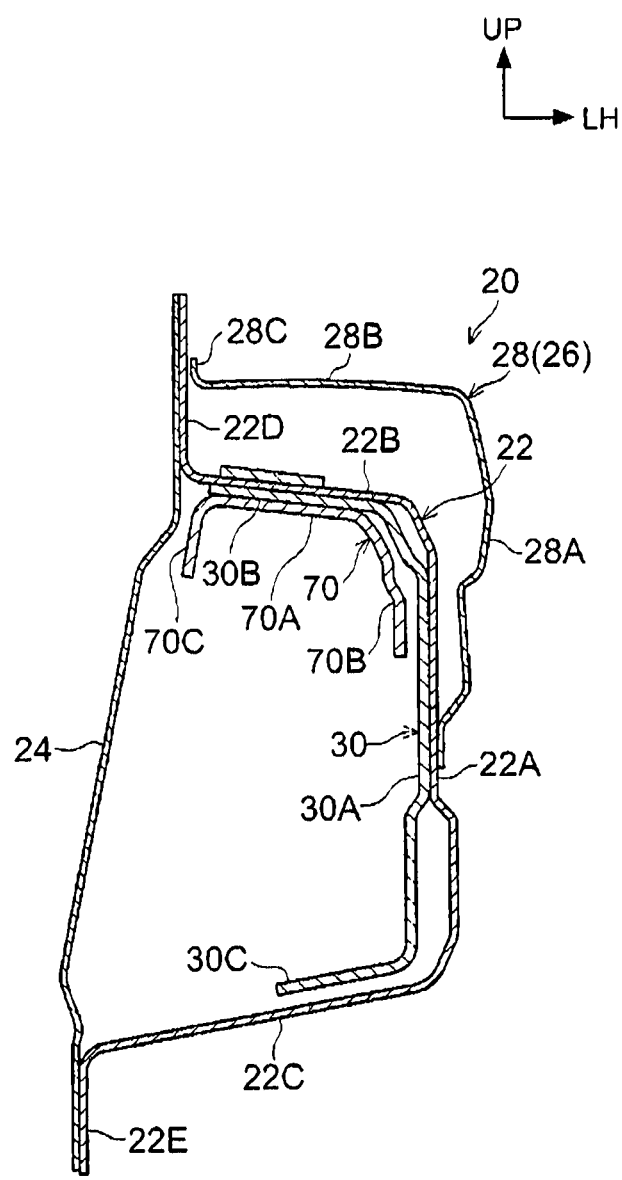
FIG. 3 is an enlarged cross-sectional view (a cross-sectional view taken along a line 3-3 of FIG. 2) of the rocker shown in FIG. 2, as viewed from ahead of the vehicle.

As shown in FIGS. 1 and 3, the rocker 20 is equipped with a rocker outer reinforcement (hereinafter referred to as "a rocker outer RF") 22. The rocker outer RF 22 is formed long with the lengthwise direction of the rocker outer RF 22 coincident with the vehicle front-rear direction, and assumes a hat-like cross-sectional shape that is open inward in the vehicle width direction in a front view. Specifically, as shown in FIG. 3, the rocker outer RF 22 is configured to include a side wall portion 22A whose thickness direction coincides with the vehicle width direction, an upper wall portion 22B and a lower wall portion 22C that are extended inward in the vehicle width direction from an upper end and a lower end of the side wall portion 22A respectively, a flange 22D that is projected upward in the vertical direction of the vehicle from an inner end of the upper wall portion 22B in the vehicle width direction, and a flange 22E that is projected downward in the vertical direction of the vehicle from an inner end of the lower wall portion 22C in the vehicle width direction. Furthermore, the upper wall portion 22B is inclined downward in the vertical direction of the vehicle, as the upper wall portion 22B extends outward in the vehicle width direction in a front view.

Besides, a rocker inner panel 24 is provided inside the rocker outer RF 22 in the vehicle width direction. This rocker inner panel 24 is arranged such that the thickness direction thereof is coincident with the vehicle width direction, and is joined to the flanges 22D and 22E of the rocker outer RF 22 through spot welding or the like. Thus, a closed cross-section is formed by the rocker outer RF 22 and the rocker inner panel 24.

Furthermore, a side outer panel 26 is provided outside the rocker outer RF 22 in the vehicle width direction. This side outer panel 26 is a large-size pressed part that constitutes outer walls of the rocker 20 and the front pillar 40. Then, that region of the side outer panel 26 which constitutes the rocker 20 is a rocker outer portion 28. The rocker outer portion 28 has a cross-section that assumes the shape of inverse L as viewed from ahead of the vehicle. Specifically, the rocker outer portion 28 is configured to include a side wall portion 28A that is joined to the side wall portion 22A of the rocker outer RF 22 through spot welding or the like, and an upper wall portion 28B that extends inward in the vehicle width direction from an upper end of the side wall portion 28A. Besides, a flange 28C that is bent upward in the vertical direction of the vehicle is formed at an inner end portion of the upper wall portion 28B in the vehicle width direction. Then, the flange 22D of the rocker outer RF 22 is joined through spot welding or the like while being sandwiched by the flange 28C of the rocker outer portion 28 and the rocker inner panel 24.

Furthermore, an inner rocker reinforcement (hereinafter referred to as "an inner rocker RF") 30 is provided on an inner face of the rocker outer RF 22. The inner rocker RF 30 is formed with a substantially U-shaped cross-section that is open inward in the vehicle width direction as viewed from ahead of the vehicle. Specifically, the inner rocker RF 30 has a side wall portion 30A that is joined to an inner face of the side wall portion 22A of the rocker outer RF 22, and an upper wall portion 30B and a lower wall portion 30C that are extended inward in the vehicle width direction from an upper end and a lower end of the side wall portion 30A in the vertical direction of the vehicle. Besides, a front wall portion 30D (see FIG. 1) is integrally formed at a front end portion of the inner rocker RF 30. The front wall portion 30D extends inward in the vehicle width direction from a front end of the side wall portion 30A.

Figure 4:
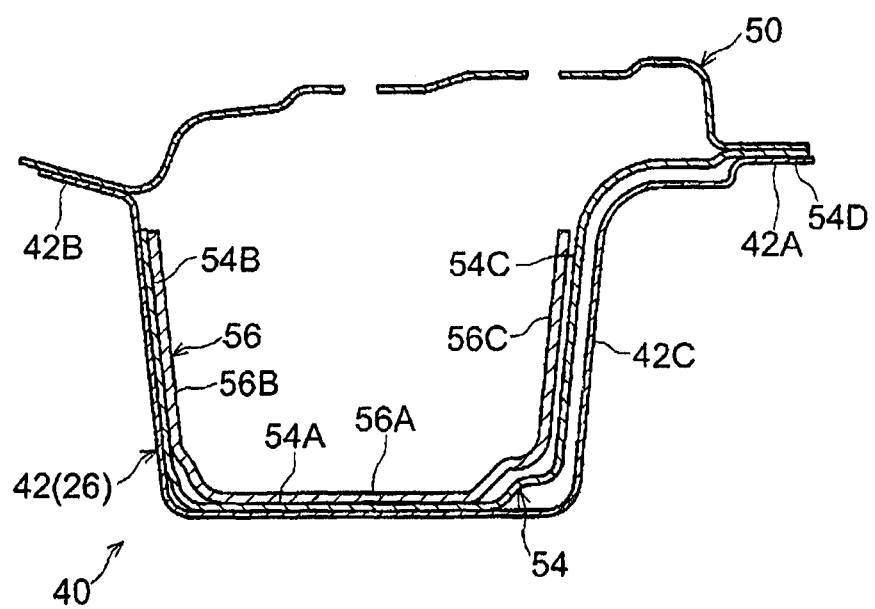
FIG. 4 is an enlarged cross-sectional view (a cross-sectional view taken along a line 4-4 of FIG. 2) of the front pillar shown in FIG. 2, as viewed from above the vehicle.

On the other hand, as shown in FIG. 2, the side outer panel 26 has a front pillar outer portion 42 that constitutes an outer region of the front pillar 40 in the vehicle width direction. As shown in FIG. 4, the front pillar outer portion 42 is formed with a hat-like cross-section that is open inward in the vehicle width direction in a plan view. Thus, a pair of flanges 42A and 42B that are extended in the vehicle front-rear direction from an inner end in the vehicle width direction are formed at an opening portion of the front pillar outer portion 42.

Besides, as shown in FIG. 2, a lower end portion of the rear wall portion 42C of the front pillar outer portion 42 is inclined in a curved manner rearward in the vehicle front-rear direction, as the lower end portion of the rear wall portion 42C extends downward in the vertical direction of the vehicle, and is smoothly connected to the upper wall portion 28B of the rocker outer portion 28. Thus, a corner portion 44 that constitutes a lower-front angle portion of the door opening portion 14 is formed at a lower end portion of the front pillar 40, and the corner portion 44 is formed in the shape of a circular arc that is concave forward in the vehicle front-rear direction and downward in the vertical direction of the vehicle in a side view. That is, the flange 42A of the front pillar outer portion 42 on the vehicle rear side is curved along the corner portion 44, extends rearward in the vehicle front-rear direction, and is connected to the flange 28C of the rocker outer portion 28. Besides, a plurality of notch portions 46 are formed in the flange 42A, and regions among the notch portions 46 serve as joint flange portions 48A to 48C. Furthermore, a joint area A (see FIG. 5) is set at a terminal end portion of the corner portion 44 of the front pillar 40. This joint area A is an area from a front end of the joint flange portion 48B, which corresponds to a terminal end 44A of the corner portion 44 of the front pillar 40, to a front end of the joint flange portion 48C (the joint flange portion adjacent to the joint flange portion 48B on the vehicle rear side).

As shown in FIGS. 1 and 4, a front pillar inner panel 50 is provided inside the front pillar outer portion 42 in the vehicle width direction. The front pillar inner panel 50 is joined to the flanges 42A and 42B of the side outer panel 26 through spot welding or the like. Thus, the front pillar 40 is formed with a closed cross-section. Besides, the lower end portion of the front pillar inner panel 50 extends to the front end portion of the rocker 20, and is arranged adjacently to the front end portion of the rocker outer RF 22 inside in the vehicle width direction (see FIG. 1).

As shown in FIG. 4, a front pillar outer reinforcement (hereinafter referred to as "a pillar outer RF") 54 is provided in the closed cross-section of the front pillar 40. The pillar outer RF 54 is formed with a substantially U-shaped cross-section that is open inward in the vehicle width direction in a plan view. Specifically, the pillar outer RF 54 is configured to include a side wall portion 54A that is arranged such that the thickness direction thereof is coincident with the vehicle width direction, and a front wall portion 54B and a rear wall portion 54C that are extended inward in the vehicle width direction from a front end and a rear end of the side wall portion 54A with respect to the vehicle respectively. Besides, the pillar outer RF 54 has a flange 54D that is projected rearward in the vehicle front-rear direction from an inner end of the rear wall portion 54C in the vehicle width direction. This flange 54D is joined through spot welding or the like while being sandwiched between the front pillar outer portion 42 and the front pillar inner panel 50. Then, at the corner portion 44 of the front pillar 40, the flange 22D of the foregoing rocker outer RF 22 and the flange 54D of the pillar outer RF 54 are joined through spot welding or the like while being sandwiched by the front pillar inner panel 50 and the side outer panel 26 (the rocker outer portion 28 and the front pillar outer portion 42). Then, these joint regions serve as joint portions 52 and 52A (see FIG. 2). Incidentally, among the joint portions, the joint portion in the joint area A is denoted by the reference symbol 52A, and the joint portion outside the joint area A is denoted by the reference numeral 52.

Besides, a hinge reinforcement (hereinafter referred to as "a hinge RF") 56 is provided inside the pillar outer RF 54. The hinge RF 56 has a substantially U-shaped cross-section that is open inward in the vehicle width direction in a plan view. Specifically, the hinge RF 56 has a side wall portion 56A whose thickness direction is coincident with the vehicle width direction, and a front wall portion 56B and a rear wall portion 56C that are extended inward in the vehicle width direction from a front end and a rear end of the side wall portion 56A with respect to the vehicle respectively. Then, the front wall portion 56B and the rear wall portion 56C are joined to inner faces of the front wall portion 54B of the pillar outer RF 54 and the rear wall portion 54C of the pillar outer RF 54 respectively through spot welding or the like. Besides, the lower end portion of the front wall portion 56B is joined through spot welding or the like while being sandwiched by the front wall portion 54B of the pillar outer RF 54 and the front wall portion 30D of the inner rocker RF 30. Furthermore, the lower end portion of the rear wall portion 56C is curved rearward in the vehicle front-rear direction, the lower end portion of the rear wall portion 56C extends downward in the vertical direction of the vehicle in a side view along the corner portion 44. Incidentally, the thickness of the front pillar outer portion 42 and the thickness of the front pillar inner panel 50 are substantially equal to each other. The thickness of the pillar outer RF 54, and the thickness of the hinge RF 56 are set in such a manner as to increase in this order.

Next, the essential part of the invention, namely, a gusset 60, a patch 70 as "an upper reinforcement member", a first bulk member 72 and a second bulk member 74 as "a front reinforcement member" and "a bulk member", and a third bulk member 76 as "a rear reinforcement member" will be described.

Figure 6:
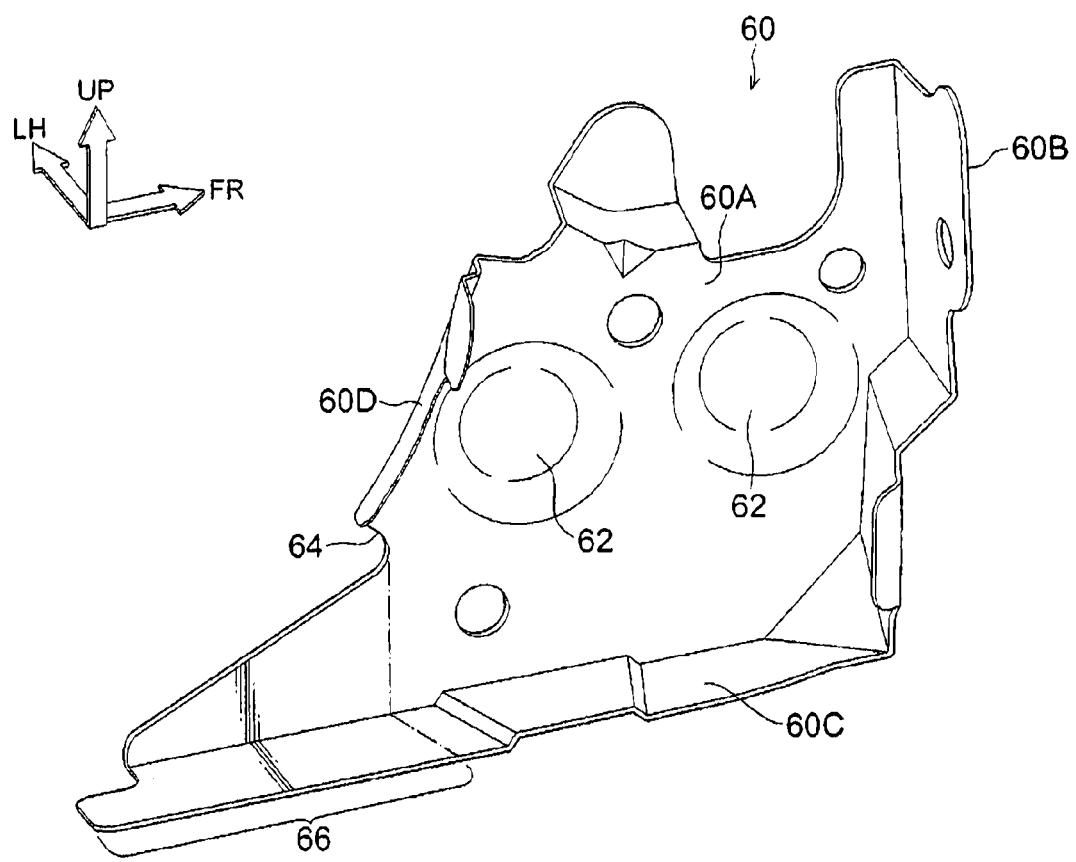
FIG. 6 is a schematic perspective view showing, on an enlarged scale, a gusset shown in FIG. 1, as viewed from inside in the vehicle width direction.

As shown in FIG. 1, the gusset 60 is provided upward in the vertical direction of the vehicle with respect to a front end portion of the rocker outer RF 22 and inside the hinge RF 56. That is, the gusset 60 is provided at the lower end portion of the front pillar 40. As shown in FIG. 6, the gusset 60 is equipped with a body wall portion 60A that is formed substantially in the shape of a trapezoidal plate in a side view, and the body wall portion 60A is arranged such that the thickness direction thereof is coincident with the vehicle width direction. A pair of gusset-side joint portions 62 is formed on the body wall portion 60A. The gusset-side joint portions 62 are protruded outward in the vehicle width direction from the body wall portion 60A, and are formed substantially in the shape of a circle in a side view. Then, the body wall portion 60A is joined, in a region of the gusset-side joint portions 62, to an inner face of the side wall portion 56A of the hinge RF 56 through spot welding or the like.

Figure 7:
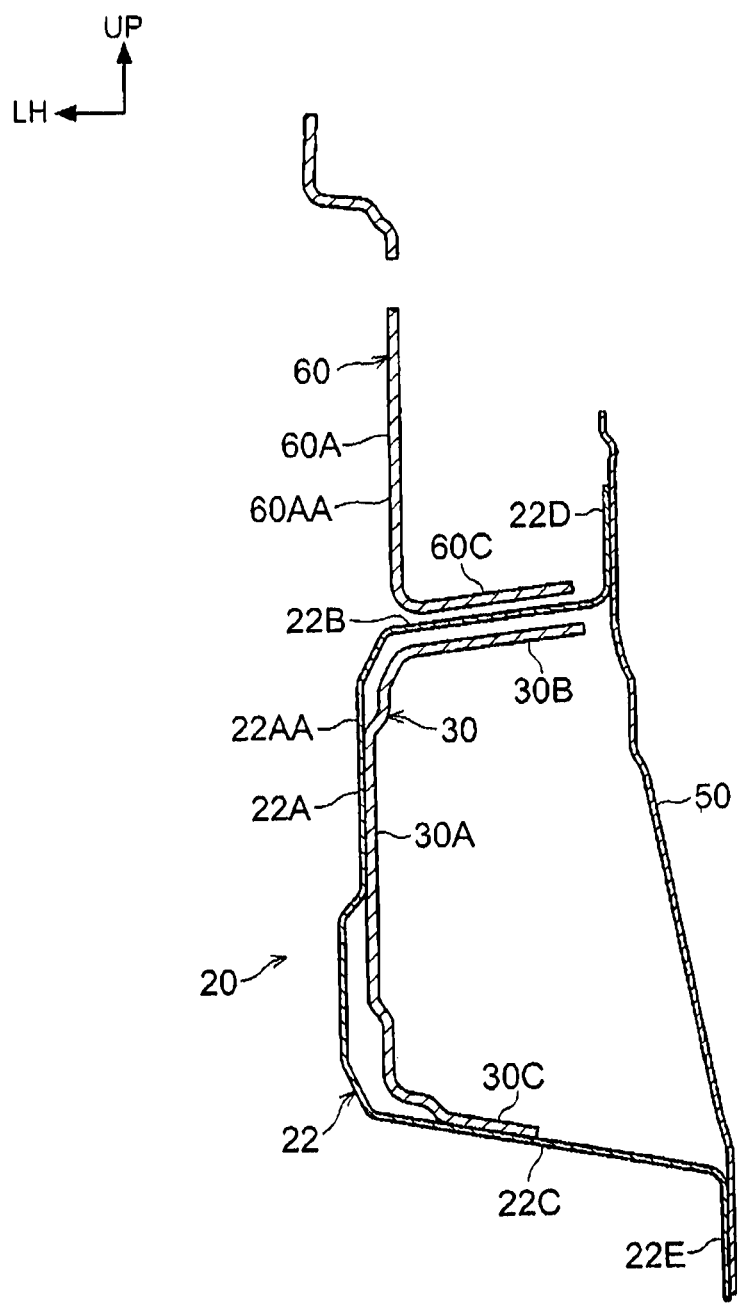
FIG. 7 is an enlarged cross-sectional view (a cross-sectional view at a position taken along a line 7-7 of FIG. 2) of a rocker outer reinforcement and the gusset shown in FIG. 2, as viewed from behind the vehicle.

Furthermore, the position of the body wall portion 60A in the vehicle width direction is set such that an outer face 60AA of the body wall portion 60A in the vehicle width direction and an outer face 22AA of the side wall portion 22A of the rocker outer RF 22 in the vehicle width direction are arranged in a same plane (see FIG. 7). Thus, in the case where a load is input downward in the vertical direction of the vehicle from the gusset 60 (the body wall portion 60A) to the rocker outer RF 22, this load is efficiently transmitted to the side wall portion 22A of the rocker outer RF 22. That is, "the arrangement in such a manner that the outer face of the body wall portion in the vehicle width direction and the outer face of the side wall portion of the rocker outer reinforcement in the vehicle width direction are arranged in a same plane" is not limited to a case where the outer face 60AA of the body wall portion 60A in the vehicle width direction and the outer face 22AA of the side wall portion 22A in the vehicle width direction are arranged in a same plane, and also includes a case where the body wall portion 60A and the side wall portion 22A are arranged such that the downward load in the vertical direction of the vehicle is efficiently transmitted to the side wall portion 22A, as described above.

Besides, a front wall portion 60B is formed at a front end portion of the gusset 60. The front wall portion 60B extends inward in the vehicle width direction from a front end of the body wall portion 60A. Then, the front wall portion 60B is joined to the front wall portion 56B of the hinge RF 56 through spot welding or the like (see FIG. 1).

As shown in FIG. 7, a bottom wall portion 60C is formed at a lower end portion of the gusset 60. The bottom wall portion 60C extends inward in the vehicle width direction from a lower end of the body wall portion 60A. Besides, the bottom wall portion 60C is arranged parallel to the upper wall portion 22B of the rocker outer RF 22, and is inclined downward in the vertical direction of the vehicle, as the bottom wall portion 60C extends outward in the vehicle width direction in a front view. That is, the angle formed by the body wall portion 60A and the bottom wall portion 60C is set at an acute angle in a front view. Then, the bottom wall portion 60C is arranged on the upper wall portion 22B of the rocker outer RF 22, and is joined to an upper face of the upper wall portion 22B through spot welding or the like. Incidentally, in the gusset 60, a front end portion of the bottom wall portion 60C and a lower end portion of the front wall portion 60B are connected to each other, and the bottom wall portion 60C and the front wall portion 60B are integrally formed. Besides, in FIG. 7, for the sake of convenience, the bottom wall portion 60C of the gusset 60 and the upper wall portion 22B of the rocker outer RF 22 are shown apart from each other.

As shown in FIG. 6, a rear end portion of the body wall portion 60A is formed like a curve extends rearward in the vehicle front-rear direction, as the rear end portion of the body wall portion 60A extends downward in the vertical direction of the vehicle in a side view, in such a manner as to extend along a lower end portion of the rear wall portion 56C of the hinge RF 56. Furthermore, a rear wall portion 60D is integrally formed at an upper portion of a rear end portion of the gusset 60. The rear wall portion 60D extends inward in the vehicle width direction from a rear end of the body wall portion 60A. Besides, an upper portion of the rear wall portion 60D is bent substantially in the shape of a crank in a plan view, and extends inward in the vehicle width direction. The rear wall portion 60D is joined to the rear wall portion 56C of the hinge RF 56 through spot welding or the like.

Furthermore, a deformation starting point portion 64 as "a fragile portion" is formed at the rear end portion of the body wall portion 60A. The deformation starting point portion 64 is arranged adjacently to a lower end of the rear wall portion 60D. Then, the deformation starting point portion 64 is cut in diagonally downward in the vertical direction of the vehicle and forward in the vehicle front-rear direction from the lower end of the rear wall portion 60D, and is formed substantially in the shape of U that is open substantially diagonally upward in the vertical direction of the vehicle and rearward in the vehicle front-rear direction in a side view, and is smoothly connected to a rear end outer peripheral portion of the body wall portion 60A. Therefore, the gusset 60 is configured to deform from the deformation starting point portion 64 when a clockwise moment as viewed from the left side of the vehicle is applied to the front wall portion 60B of the gusset 60.

By the way, when the aforementioned moment is applied to the front wall portion 60B of the gusset 60, a downward load in the vertical direction of the vehicle is applied from the bottom wall portion 60C of the gusset 60 to the upper wall portion 22B of the rocker outer RF 22. Then, this load increases rearward in the vehicle front-rear direction at the bottom wall portion 60C. Besides, as described above, the gusset 60 is configured to deform from the deformation starting point portion 64 when the aforementioned moment is applied to the front wall portion 60B of the gusset 60. Therefore, the aforementioned load is mainly applied from the rear end portion 66 of the bottom wall portion 60C (specifically, an area of the bottom wall portion 60C rearward in the vehicle front-rear direction with respect to the deformation starting point portion 64) to the upper wall portion 22B of the rocker outer RF 22. Thus, "the rear end portion of the bottom wall portion of the gusset" in the invention refers to an area rearward in the vehicle front-rear direction with respect to the bottom wall portion 60C where the aforementioned load is mainly applied to the upper wall portion 22B of the rocker outer RF 22.

As shown in FIGS. 1 and 3, the patch 70 is provided inside the rocker outer RF 22. This patch 70 is formed substantially in the shape of a long plate that extends in the vehicle front-rear direction, and substantially assumes the shape of U that is open downward in the vertical direction of the vehicle in a front view. Specifically, the patch 70 has a top wall portion 70A, and an outer wall portion 70B and an inner wall portion 70C as "bent portions" that extend downward in the vertical direction of the vehicle from both ends of the top wall portion 70A in the vehicle width direction respectively. The up and down dimension of the outer wall portion 70B is set longer than the up and down dimension of the inner wall portion 70C. Then, the top wall portion 70A of the patch 70 is joined to the inner face (the lower face) of the rocker outer RF 22 via the upper wall portion 30B of the inner rocker RF 30 through spot welding or the like. Besides, a front end portion of the patch 70 is arranged downward in the vertical direction of the vehicle with respect to the gusset 60, and a rear end portion of the patch 70 is arranged rearward in the vehicle front-rear direction with respect to the terminal end 44A of the corner portion 44 of the front pillar 40.

Figure 8:
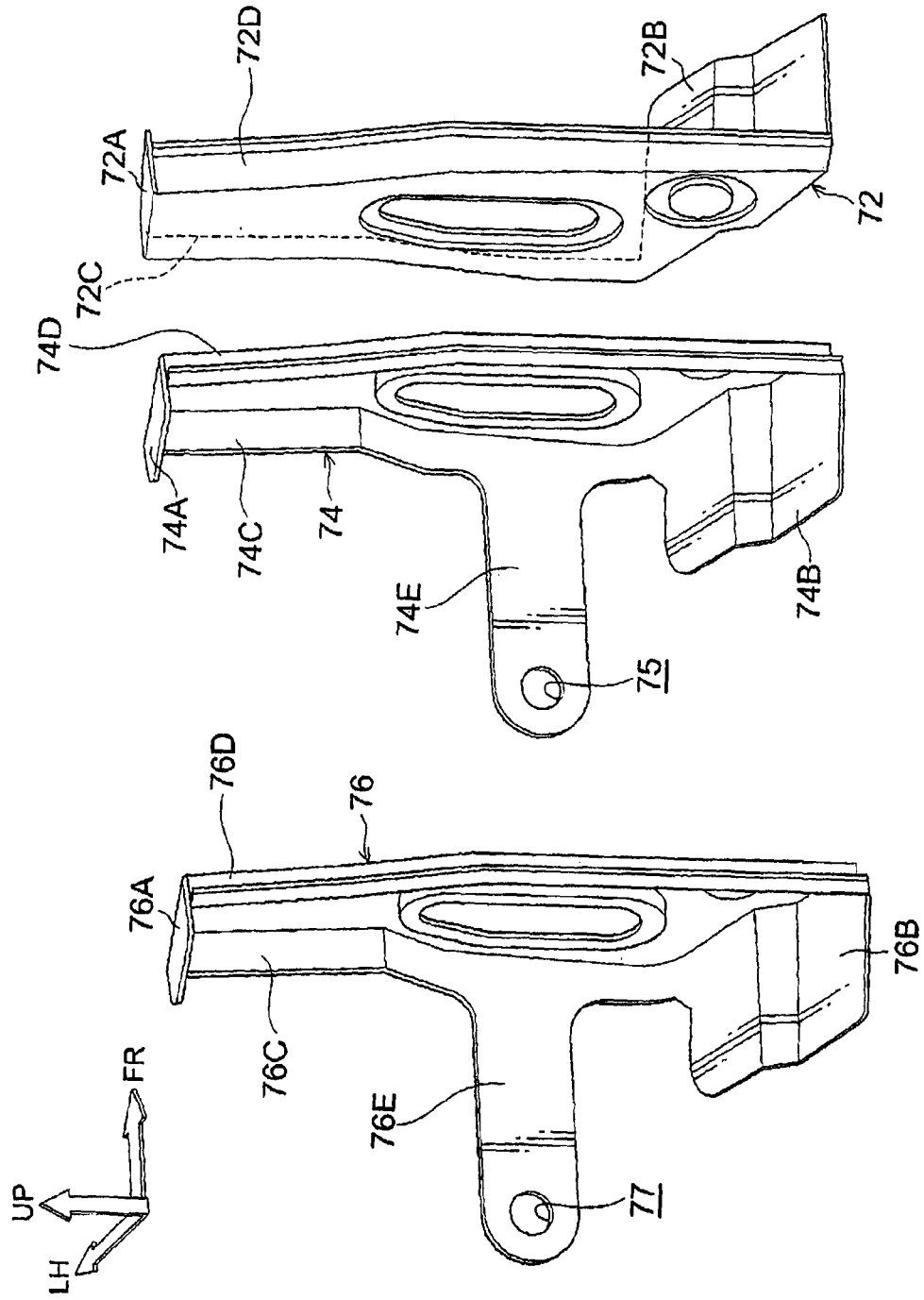
FIG. 8 is a schematic perspective view showing, on an enlarged scale, a first bulk member, a second bulk member, and a third bulk member shown in FIG. 1, as viewed from inside in the vehicle width direction.

As shown in FIGS. 1 and 8, the first bulk member 72 is provided in the rocker outer RF 22 (in the closed cross-section of the rocker 20), and is arranged downward in the vertical direction of the vehicle with respect to the gusset 60. This first bulk member 72 is formed substantially in the shape of a rectangular plate, with the lengthwise direction thereof coincident with the vertical direction of the vehicle in a front view, and is arranged with the thickness direction thereof coincident with the vehicle front-rear direction. Besides, an upper flange portion 72A is integrally formed at an upper end portion of the first bulk member 72. The upper flange portion 72A extends forward in the vehicle front-rear direction from an upper end of the first bulk member 72. Then, with the top wall portion 70A of the patch 70 sandwiched by the upper flange portion 72A and the upper wall portion 22B of the rocker outer RF 22, the upper flange portion 72A is joined to an inner face (a lower face) of the upper wall portion 22B of the rocker outer RF 22 via the upper wall portion 30B of the inner rocker RF 30, through spot welding or the like.

Besides, a lower flange portion 72B is integrally formed at a lower end portion of the first bulk member 72. The lower flange portion 72B extends forward in the vehicle front-rear direction from a lower end of the first bulk member 72. Besides, an intermediate portion of the lower flange portion 72B in the vehicle width direction is bent substantially in the shape of a crank, and an outer region of the lower flange portion 72B in the vehicle width direction bulges upward in the vertical direction of the vehicle. Then, with the lower wall portion 30C of the inner rocker RF 30 sandwiched by the outer region of the lower flange portion 72B in the vehicle width direction and the lower wall portion 22C of the rocker outer RF 22, the lower flange portion 72B is joined to an inner face (an upper face) of the lower wall portion 22C of the rocker outer RF 22 through spot welding or the like.

Furthermore, an outer flange portion 72C that extends forward in the vehicle front-rear direction from an outer end of the first bulk member 72 in the vehicle width direction, and an inner flange portion 72D that extends forward in the vehicle front-rear direction from an inner end of the first bulk member 72 in the vehicle width direction are integrally formed on the first bulk member 72. This outer flange portion 72C and this inner flange portion 72D connect the upper flange portion 72A with the lower flange portion 72B respectively. Then, the outer flange portion 72C is arranged slightly apart from a side wall portion 30A of the inner rocker RF 30. Besides, a tip portion (a front end portion) of the inner flange portion 72D is bent inward in the vehicle width direction, and is arranged slightly apart from the front pillar inner panel 50.

The second bulk member 74 is provided in the rocker outer RF 22 (in the closed cross-section of the rocker 20), and is arranged rearward in the vehicle front-rear direction with respect to the first bulk member 72. This second bulk member 74 is formed substantially in the shape of a rectangular plate with the lengthwise direction thereof coincident with the vertical direction of the vehicle in a front view, and is arranged such that the thickness direction thereof is coincident with the vehicle front-rear direction. Besides, an upper flange portion 74A as "an upper flange portion" is integrally formed at an upper end portion of the second bulk member 74. The upper flange portion 74A extends rearward in the vehicle front-rear direction from an upper end of the second bulk member 74. Then, with the top wall portion 70A of the patch 70 sandwiched by the upper flange portion 74A and the upper wall portion 22B of the rocker outer RF 22, the upper flange portion 74A is joined to the inner face (the lower face) of the upper wall portion 22B of the rocker outer RF 22 via the upper wall portion 30B of the inner rocker RF 30, through spot welding or the like.

Besides, a lower flange portion 74B as "a lower flange portion" is integrally formed at a lower end portion of the second bulk member 74. The lower flange portion 74B extends rearward in the vehicle front-rear direction from a lower end of the second bulk member 74. Besides, an intermediate portion of the lower flange portion 74B in the vehicle width direction is bent substantially in the shape of a crank, and an outer region of the lower flange portion 74B in the vehicle width direction bulges upward in the vertical direction of the vehicle. Then, with the lower wall portion 30C of the inner rocker RF 30 sandwiched by the outer region of the lower flange portion 74B in the vehicle width direction and the lower wall portion 22C of the rocker outer RF 22, the lower flange portion 74B is joined to the inner face (the upper face) of the lower wall portion 22C of the rocker outer RF 22 through spot welding or the like.

Furthermore, an outer flange portion 74C that extends rearward in the vehicle front-rear direction from an outer end of the second bulk member 74 in the vehicle width direction, and an inner flange portion 74D that extends rearward in the vehicle front-rear direction from an inner end of the second bulk member 74 in the vehicle width direction are integrally formed on the second bulk member 74. This outer flange portion 74C and this inner flange portion 74D connect the upper flange portion 74A with the lower flange portion 74B respectively. Then, the outer flange portion 74C is arranged slightly apart from the side wall portion 30A of the inner rocker RF 30. Besides, a tip portion (a rear end portion) of the inner flange portion 74D is bent inward in the vehicle width direction, and is arranged slightly apart from the front pillar inner panel 50. Furthermore, a protrusion strip 74E that extends rearward in the vehicle front-rear direction is integrally formed at an intermediate portion of the outer flange portion 74C in the vertical direction, and a circular positioning hole 75 is formed in a penetrating manner at a rear end portion of the protrusion strip 74E. A positioning boss 31A (see FIG. 1) that is formed at the side wall portion 30A of the inner rocker RF 30 is inserted in this positioning hole 75, and is configured such that the position of the second bulk member 74 with respect to the inner rocker RF 30 (the rocker outer RF 22) is determined.

Then, the first bulk member 72 and the second bulk member 74 are arranged in such a manner as to support the rear end portion 66 at the bottom wall portion 60C of the gusset 60 via the upper wall portion 22B of the rocker outer RF 22. Specifically, in a side view, the first bulk member 72 is arranged downward in the vertical direction of the vehicle with respect to the rear end portion 66 at the bottom wall portion 60C of the gusset 60, and the second bulk member 74 is arranged rearward in the vehicle front-rear direction with respect to this rear end portion 66. Thus, the rear end portion 66 of the bottom wall portion 60C is arranged between the first bulk member 72 and the second bulk member 74, and the rear end portion 66 is supported by the first bulk member 72 and the second bulk member 74 as well (see FIGS. 2 and 5).

The third bulk member 76 is provided in the rocker outer RF 22 (in the closed cross-section of the rocker 20), and is arranged rearward in the vehicle front-rear direction with respect to the second bulk member 74. Then, the third bulk member 76 is configured in the same manner as the second bulk member 74. That is, the third bulk member 76 is formed substantially in the shape of a rectangular plate with the lengthwise direction thereof coincident with the vertical direction of the vehicle in a front view, and is arranged such that the thickness direction thereof is coincident with the vehicle front-rear direction. Besides, an upper flange portion 76A as "an upper flange portion" is integrally formed at an upper end portion of the third bulk member 76, and the upper flange portion 76A extends rearward in the vehicle front-rear direction from an upper end of the third bulk member 76. Then, with the top wall portion 70A of the patch 70 sandwiched by the upper flange portion 76A and the upper wall portion 22B of the rocker outer RF 22, the upper flange portion 76A is joined to the inner face (the lower face) of the upper wall portion 22B of the rocker outer RF 22 through spot welding or the like, via the upper wall portion 30B of the inner rocker RF 30.

Besides, a lower flange portion 76B as "a lower flange portion" is integrally formed at a lower end portion of the third bulk member 76. The lower flange portion 76B extends rearward in the vehicle front-rear direction from a lower end of the third bulk member 76. Besides, an intermediate portion of the lower flange portion 76B in the vehicle width direction is bent substantially in the shape of a crank, and an outer region of the lower flange portion 76B in the vehicle width direction bulges upward in the vertical direction of the vehicle. Then, with the lower wall portion 30C of the inner rocker RF 30 sandwiched by an outer region of the lower flange portion 76B in the vehicle width direction and the lower wall portion 22C of the rocker outer RF 22, the lower flange portion 76B is joined to the inner face (the upper face) of the lower wall portion 22C of the rocker outer RF 22 through spot welding or the like.

Furthermore, an outer flange portion 76C that extends rearward in the vehicle front-rear direction from an outer end of the third bulk member 76 in the vehicle width direction, and an inner flange portion 76D that extends rearward in the vehicle front-rear direction from an inner end of the third bulk member 76 in the vehicle width direction are integrally formed on the third bulk member 76. This outer flange portion 76C and this inner flange portion 76D connect the upper flange portion 76A with the lower flange portion 76B respectively. Then, the outer flange portion 76C is arranged slightly apart from the side wall portion 30A of the inner rocker RF 30. Besides, a tip portion (a rear end portion) of the inner flange portion 76D is bent inward in the vehicle width direction, and is arranged slightly apart from the front pillar inner panel 50. Furthermore, a protrusion strip 76E that extends rearward in the vehicle front-rear direction is integrally formed at an intermediate portion of the outer flange portion 76C in the vertical direction, and a circular positioning hole 77 is formed in a penetrating manner at a rear end portion of the protrusion strip 76E. A positioning boss 31B (see FIG. 1) that is formed at the side wall portion 30A of the inner rocker RF 30 is inserted in this positioning hole 77, and is configured such that the position of the third bulk member 76 with respect to the inner rocker RF 30 (the rocker outer RF 22) is determined.

Figure 5:
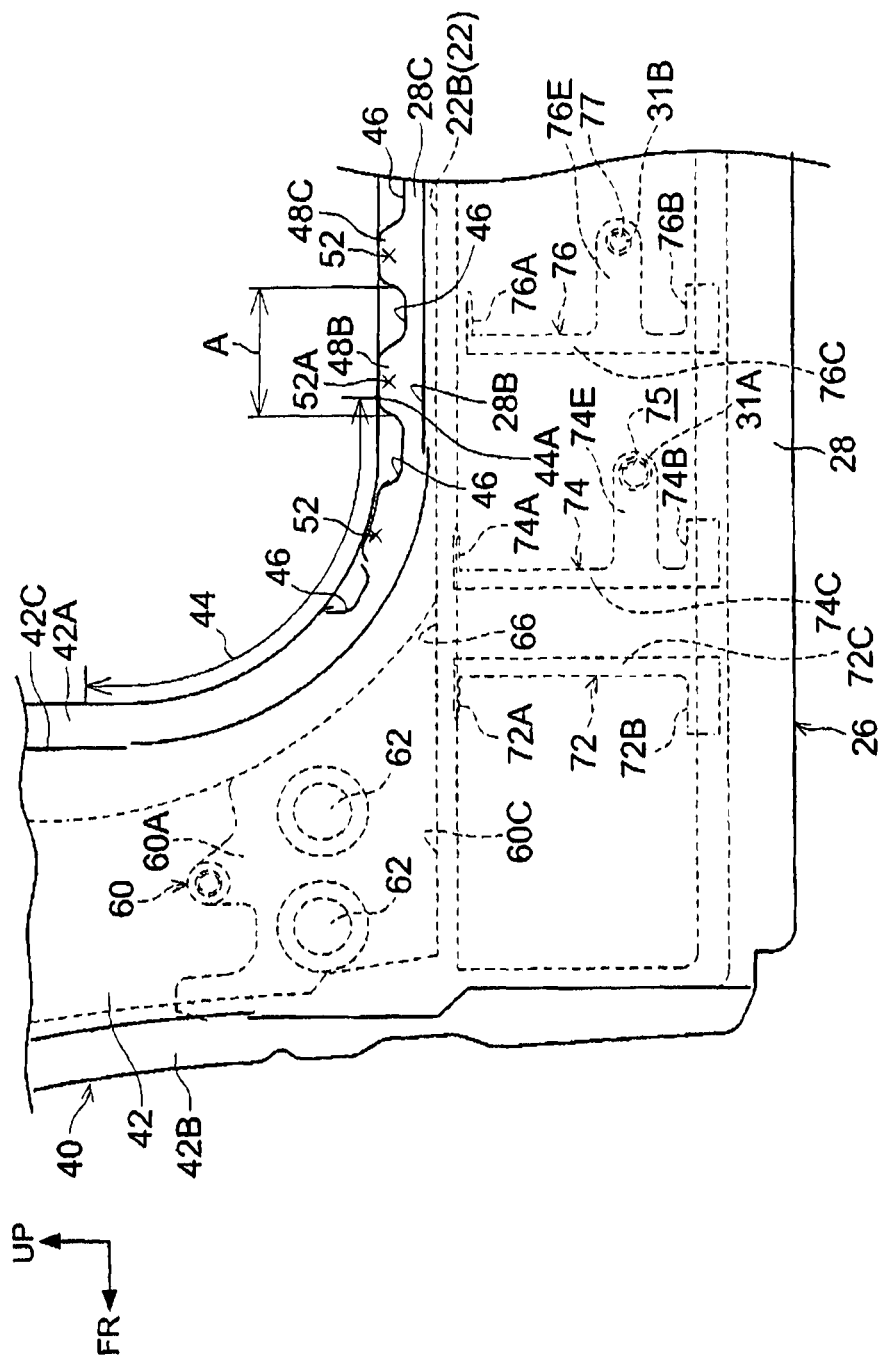
FIG. 5 is an enlarged side view of the front end portion of the rocker and the lower end portion of the front pillar shown in FIG. 2, as viewed from outside in the vehicle width direction.

Then, as shown in FIG. 5, the third bulk member 76 is arranged downward in the vertical direction of the vehicle with respect to the joint area A, which is set at the terminal end portion of the corner portion 44 of the front pillar 40. In other words, the joint area A and the third bulk member 76 are arranged overlapping with each other in the vertical direction of the vehicle in a side view. Furthermore, the third bulk member 76 is arranged rearward in the vehicle front-rear direction with respect to a joint portion 52A in the joint area A.

Next, the operation and effect of the present embodiment of the invention will be described.

In the case where the vehicle 10 that is equipped with the vehicle side structure S configured as described above undergoes a small overlap collision, the front wheel 12 moves rearward in the vehicle front-rear direction, and hits the front end portion of the rocker 20 and the front pillar 40. When the front wheel 12 hits the front pillar 40, the front pillar 40 is about to collapse rearward in the vehicle front-rear direction, and a clockwise moment as viewed from the left side of the vehicle is generated in the front pillar 40.

It should be noted herein that the gusset 60 is provided at the lower end portion of the front pillar 40. Then, the body wall portion 60A of the gusset 60 is joined to the hinge RF 56 (the front pillar 40), and the bottom wall portion 60C of the gusset 60 is joined to the upper face of the upper wall portion 22B of the rocker outer RF 22.

Thus, when the front pillar 40 is about to collapse rearward in the vehicle front-rear direction at the time of a small overlap collision, a downward load (a moment load) in the vertical direction of the vehicle is applied from the bottom wall portion 60C of the gusset 60 to the upper wall portion 22B of the rocker outer RF 22, due to the aforementioned moment. At this time, the upper wall portion 22B of the rocker outer RF 22 supports the bottom wall portion 60C of the gusset 60 from below the vehicle, so the front pillar 40 is restrained from collapsing rearward in the vehicle front-rear direction.

Besides, the rocker outer RF 22 receives, on a surface thereof, a load input from the bottom wall portion 60C of the gusset 60. Therefore, the load input to the rocker outer RF 22 is dispersed, and the load can be restrained from concentrating on the rocker outer RF 22. Thus, the rocker 20 can be restrained from bending (the cross-section thereof can be restrained from collapsing).

Furthermore, the bottom wall portion 60C of the gusset 60 is bent inward in the vehicle width direction at the lower end portion of the body wall portion 60A. Therefore, on the gusset 60, the ridgeline of the boundary region between the bottom wall portion 60C and the body wall portion 60A extends in the vehicle front-rear direction. Thus, a rearward collision load in the vehicle front-rear direction, which is input to the front pillar 40, is transmitted rearward in the vehicle front-rear direction through the ridgeline. As a result, the rocker 20 can be restrained from buckling.

Owing to the foregoing, the front pillar 40 can be restrained from collapsing rearward at the time of a small overlap collision of the vehicle 10, and the rocker 20 can be restrained from deforming.

Besides, the bottom wall portion 60C of the gusset 60 is inclined downward in the vertical direction of the vehicle, as the bottom wall portion 60C extends outward in the vehicle width direction in a front view. That is, in a front view, the angle formed by the body wall portion 60A and the bottom wall portion 60C is set at an acute angle. Therefore, a downward load in the vertical direction of the vehicle, which is input from the bottom wall portion 60C of the gusset 60 to the upper wall portion 22B of the rocker outer RF 22, is applied in the direction of inclination of the bottom wall portion 60C of the gusset 60 as well. That is, this load is also applied in such a direction as to shear the overlapping region of the bottom wall portion 60C of the gusset 60 and the upper wall portion 22B of the rocker outer RF 22 in the direction of inclination of the bottom wall portion 60C of the gusset 60. Thus, the rocker 20 can be more restrained from bending (the cross-section thereof can be more restrained from collapsing) than in the case where the bottom wall portion 60C of the gusset 60 is horizontally arranged.

Besides, as described above, in the gusset 60, the angle formed by the body wall portion 60A and the bottom wall portion 60C is set at an acute angle. Therefore, the load transmitted through the ridgeline of the boundary region between the body wall portion 60A and the bottom wall portion 60C can be made larger than in the case where the angle formed by the body wall portion 60A and the bottom wall portion 60C is set at a right angle. Thus, a rearward collision load in the vehicle front-rear direction, which is input to the gusset 60 (the front pillar 40), can be efficiently transmitted rearward in the vehicle front-rear direction. As a result, the rocker 20 can be further restrained from buckling through deformation.

Furthermore, the position of the body wall portion 60A in the vehicle width direction is set such that the outer face 60AA of the body wall portion 60A in the vehicle width direction and the outer face 22AA of the side wall portion 22A of the rocker outer RF 22 in the vehicle width direction are arranged in a same plane. Therefore, a downward load in the vertical direction of the vehicle, which is input from the gusset 60 to the rocker outer RF 22, is efficiently transmitted to the side wall portion 22A of the rocker outer RF 22. As a result, this load is also transmitted to the lower wall portion 22C through the side wall portion 22A, so the front pillar 40 can be further restrained from collapsing rearward. Moreover, the side wall portion 22A extends in the vertical direction of the vehicle in a front view. Therefore, a downward load in the vertical direction of the vehicle, which is input from the gusset 60 to the rocker outer RF 22, can be received by the side wall portion 22A that exhibits high bending rigidity for the downward load in the vertical direction of the vehicle. Thus, the rocker 20 can be further restrained from bending.

Besides, the first bulk member 72 and the second bulk member 74 are provided inside the front end portion of the rocker 20 (in the closed cross-section). Then, the first bulk member 72 and the second bulk member 74 are arranged downward in the vertical direction of the vehicle with respect to the gusset 60, and support the rear end portion 66 of the bottom wall portion 60C of the gusset 60 together with the upper wall portion 22B of the rocker outer RF 22. Thus, the rocker 20 can be effectively restrained from bending at the front end portion thereof.

That is, as described above, when the front pillar 40 is about to collapse rearward in the vehicle front-rear direction at the time of a small overlap collision, a clockwise moment as viewed from the left side of the vehicle is applied to the gusset 60. Therefore, a load (a moment load) that is applied from the bottom wall portion 60C of the gusset 60 to the upper wall portion 22B of the rocker outer RF 22 increases rearward in the vehicle front-rear direction. In contrast, according to the present embodiment of the invention, the first bulk member 72 and the second bulk member 74 support the rear end portion 66 of the bottom wall portion 60C of the gusset 60 together with the upper wall portion 22B of the rocker outer RF 22. Therefore, a large load input to the upper wall portion 22B of the rocker outer RF 22 can be received by the first bulk member 72 and the second bulk member 74 as well. Thus, the rocker 20 can be effectively restrained from bending at the front end portion thereof.

Furthermore, the third bulk member 76 is provided inside the rocker 20 (in the closed cross-section). The third bulk member 76 is arranged downward in the vertical direction of the vehicle with respect to the joint area A, which is set at the terminal end portion of the corner portion 44 of the front pillar 40. Thus, the bending position of the rocker 20 at the time of a small overlap collision can be set as a position rearward in the vehicle front-rear direction with respect to the terminal end portion of the corner portion 44 of the front pillar 40, and the amount of rearward movement of the front pillar 40 in the vehicle front-rear direction at the time of a small overlap collision can be reduced.

Figure 9A:
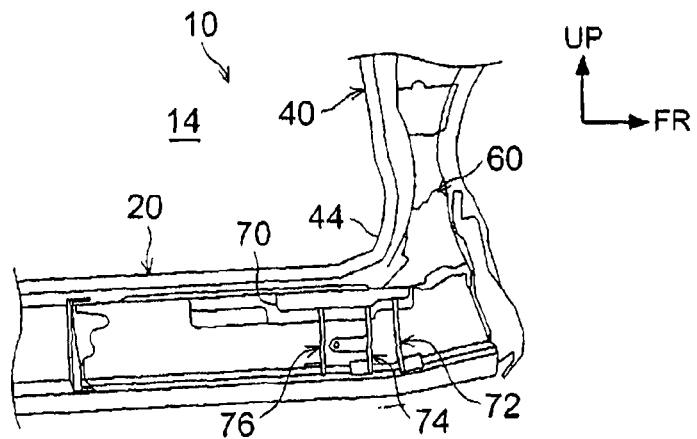
FIG. 9A is a schematic view showing, in a time-series manner, the state of the lower end portion of the front pillar and the front end portion of the rocker at the time of a small overlap collision, and is a schematic view showing the state of the lower end portion of the front pillar and the front end portion of the rocker in an initial stage of the small overlap collision.
Figure 9B:
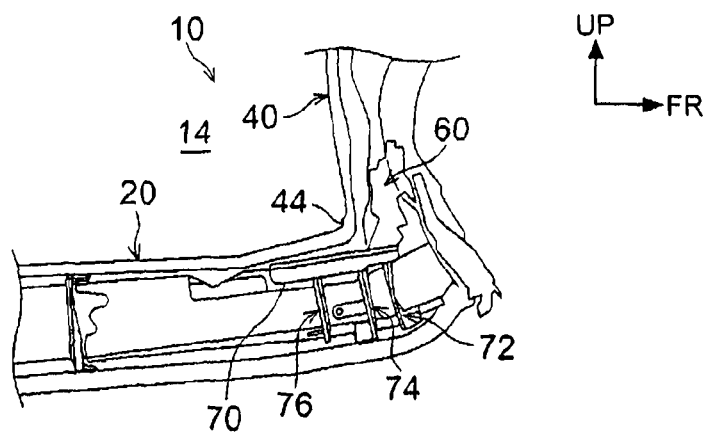
FIG. 9B is a schematic view showing, in a time-series manner, the state of the lower end portion of the front pillar and the front end portion of the rocker at the time of the small overlap collision, as viewed from inside in the vehicle width direction, and is a schematic view showing the state of the lower end portion of the front pillar and the front end portion of the rocker after the lapse of more time from the state of FIG. 9A.
Figure 9C:
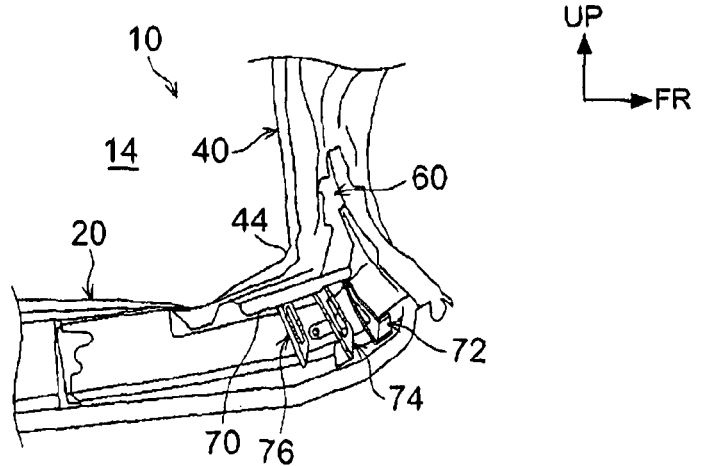
FIG. 9C is a schematic view showing, in a time-series manner, the state of the lower end portion of the front pillar and the front end portion of the rocker at the time of the small overlap collision, as viewed from inside in the vehicle width direction, and is a schematic view showing the state of the lower end portion of the front pillar and the front end portion of the rocker after the lapse of more time from the state of FIG. 9B, as viewed from inside in the vehicle width direction.

That is, in the case where the front pillar 40 and the rocker 20 are reinforced by the gusset 60, the first bulk member 72, and the second bulk member 74 as mentioned above, a large moment is generated at the terminal end portion of the corner portion 44 of the front pillar 40. In contrast, according to the present embodiment of the invention, the third bulk member 76 is arranged downward in the vertical direction of the vehicle with respect to the joint area A, which is set at the terminal end portion of the corner portion 44, so the terminal end portion of the corner portion 44 is supported by the third bulk member 76. Therefore, a moment load resulting from the aforementioned moment can be received by the third bulk member 76. Thus, at the time of a small overlap collision of the vehicle 10, the rocker 20 and the front pillar 40 change from an initial stage of the small overlap collision shown in FIG. 9(A) to a state of FIG. 9(B), and eventually assume a state, of FIG. 9(C). Accordingly, as shown in FIG. 9(C), in the present embodiment of the invention, the rocker 20 is restrained from bending at the terminal end portion of the corner portion 44, and the bending position of the rocker 20 is set as a position rearward in the vehicle front-rear direction with respect to the terminal end portion of the corner portion 44. Specifically, the bending position of the rocker 20 is set as a position rearward in the vehicle front-rear direction with respect to the patch 70. As a result, the amount of rearward movement of the front pillar 40 in the vehicle front-rear direction at the time of a small overlap collision can be reduced.

Moreover, the third bulk member 76 is arranged rearward in the vehicle front-rear direction with respect to the joint portion 52A of the joint area A. Therefore, the moment load that is generated at the terminal end portion of the corner portion 44 of the front pillar 40 due to the aforementioned moment can be transmitted to the third bulk member 76 by the joint portion 52A as well. Thus, the rocker 20 can be further restrained from bending at the terminal end portion of the corner portion 44.

Besides, the deformation starting point portion 64 is formed at the rear end portion of the body wall portion 60A of the gusset 60. Therefore, when the aforementioned moment is applied to the gusset 60, the gusset 60 deforms in such a manner as to collapse rearward in the vehicle front-rear direction from the deformation starting point portion 64. Therefore, the collision load input to the gusset 60 is absorbed through deformation of the gusset 60, so the moment load input to the rocker outer RF 22 can be reduced. Incidentally, in order to restrain the front pillar 40 from collapsing, it is preferable that the gusset 60 do not deform. However, if the gusset 60 does not deform at all, the load applied from the front pillar 40 to the gusset 60 is transmitted to the upper face of the upper wall portion 22B of the rocker outer RF 22. Therefore, the rocker 20 bends, so the amount of rearward movement of the front pillar 40 ends up increasing. Thus, the deformation starting point portion 64 is formed at the body wall portion 60A of the gusset 60 to deform the gusset 60 prior to the deformation of the rocker 20. It is therefore possible to restrain the rocker 20 from bending, and contribute toward restraining the amount of rearward movement of the front pillar 40 from increasing.

Furthermore, the upper flange portion 72A and the lower flange portion 72B are provided on the first bulk member 72. The upper flange portion 72A and the lower flange portion 72B are joined to the upper wall portion 22B and the lower wall portion 22C of the rocker outer RF respectively. Besides, the upper flange portion 74A and the lower flange portion 74B are provided on the second bulk member 74. The upper flange portion 74A and the lower flange portion 74B are joined to the upper wall portion 22B and the lower wall portion 22C of the rocker outer RF respectively. That is, the upper wall portion 22B and the lower wall portion 22C of the rocker outer RF are connected by the first bulk member 72 and the second bulk member 74 as well. Therefore, this upper wall portion 22B and this lower wall portion 22C can be supported in the vertical direction of the vehicle by the first bulk member 72 and the second bulk member 74. Thus, the rocker 20 can be more effectively restrained from bending at the tip portion thereof.

Besides, the rear end portion 66 at the bottom wall portion 60C of the gusset 60 is arranged between the first bulk member 72 and the second bulk member 74 in a side view. That is, the rear end portion 66 of the bottom wall portion 60C of the gusset 60 is supported by the pair of the first bulk member 72 and the second bulk member 74. Therefore, for example, the weight of the vehicle can be made lighter than in the case where the first bulk member 72 and the second bulk member 74 are configured to continuously support the gusset 60 along the vehicle front-rear direction. Besides, for example, in the case where the joint portion between the gusset 60 and the upper wall portion 22B of the rocker outer RF 22 is located between the first bulk member 72 and the second bulk member 74, the first bulk member 72 and the second bulk member 74 can be arranged in such a manner as to avoid this joint portion.

Furthermore, the joint portion 52A in the joint area A, which is set at the terminal end portion of the corner portion 44, is arranged between the second bulk member 74 and the third bulk member 76 in a side view. Therefore, for example, the weight of the vehicle can be made lighter than in the case where the second bulk member 74 and the third bulk member 76 are configured to continuously support the gusset 60 and the corner portion 44 along the vehicle front-rear direction. Besides, for example, in the case where another member or the like is located between the second bulk member 74 and the third bulk member 76, the third bulk member 76 can be arranged in such a manner as to avoid this member or the like.

Besides, the upper flange portion 74A (the upper flange portion 76A) and the lower flange portion 74B (the lower flange portion 76B), which extend rearward in the vehicle front-rear direction, are formed on the second bulk member 74 (the third bulk member 76). Then, the upper flange portion 74A (the upper flange portion 76A) and the lower flange portion 74B (the lower flange portion 76B) are joined to the upper wall portion 22B and the lower wall portion 22C of the rocker outer RF 22 respectively.

Therefore, the upper flange portion 74A (the upper flange portion 76A) and the lower flange portion 74B (the lower flange portion 76B) are arranged in such a manner as to resist the moment applied to the rocker outer RF 22. Thus, the shape of the second bulk member 74 (the third bulk member 76) can be made effective from the standpoint of restraining the rocker 20 from bending.

Furthermore, the patch 70 that extends in the vehicle front-rear direction is provided between the first bulk member 72, the second bulk member 74, and the third bulk member 76 on the one hand and the upper wall portion 22B of the rocker outer RF 22 on the other hand. Thus, the first bulk member 72, the second bulk member 74, and the third bulk member 76 are connected to one another by the patch 70. Besides, the upper wall portion 22B of the rocker outer RF 22 is reinforced by the patch 70 as well. Thus, the bending rigidity of the rocker 20 at the front end portion thereof can be enhanced.

Besides, both the end portions of the patch 70 in the vehicle width direction are bent downward in the vertical direction of the vehicle, and the outer wall portion 70B and the inner wall portion 70C are formed on the patch 70. Thus, the bending rigidity of the patch 70 can be enhanced. As a result, the bending rigidity of the rocker 20 at the front end portion thereof can be further enhanced.

Furthermore, the lower end portion of the front wall portion 56B of the hinge RF 56 is joined through spot welding or the like, while being sandwiched by the front wall portion 54B of the pillar outer RF 54 and the front wall portion 30D of the inner rocker RF 30 of the rocker 20. Therefore, the lower end portion of the hinge RF 56 is supported from rearward in the vehicle front-rear direction by the front wall portion 30D of the inner rocker RF 30. Thus, the effect of restraining the front pillar 40 from collapsing rearward in the vehicle front-rear direction at the time of a small overlap collision can be enhanced.

Incidentally, in the present embodiment of the invention, spot welding is exemplified as a method of "joining".

However, the process of "joining" may be carried out through other types of welding such as arc welding, laser welding or the like, or adhesion.

Besides, in the present embodiment of the invention, the bottom wall portion 60C of the gusset 60 is inclined downward in the vertical direction of the vehicle, as the bottom wall portion 60C of the gusset 60 extends outward in the vehicle width direction in a front view. Instead, the bottom wall portion 60C of the gusset 60 may be arranged substantially horizontally.

Furthermore, in the present embodiment of the invention, the deformation starting point portion 64 of the gusset 60 is notched diagonally downward in the vertical direction of the vehicle and forward in the vehicle front-rear direction, but the shape of the deformation starting point portion 64 is not limited thereto. For example, it is acceptable to form the deformation starting point portion 64 in the shape of a convex portion, and adopt a configuration in which the gusset 60 deforms from the deformation starting point portion 64 in response to a rearward moment in the vehicle front-rear direction.

Besides, in the present embodiment of the invention, the first bulk member 72, the second bulk member 74, and the third bulk member 76 are configured separately from one another. However, the first bulk member 72, the second bulk member 74, and the third bulk member 76 may be configured integrally with one another.

Furthermore, in the present embodiment of the invention, the patch 70 is provided between the first bulk member 72, the second bulk member 74, and the third bulk member 76 on the one hand and the upper wall portion 22B of the rocker outer RF 22 on the other hand. However, the patch 70 may be omitted.

Besides, in the present embodiment of the invention, the outer wall portion 70B and the inner wall portion 70C are formed on the patch 70. However, one of the outer wall portion 70B and the inner wall portion 70C may be omitted.

The invention claimed is:

1. A vehicle side structure comprising:
   a rocker that extends in a vehicle front-rear direction on each of both sides of a vehicle lower portion in a vehicle width direction, the rocker including a closed cross-section that is constituted by a rocker outer reinforcement and a rocker inner panel, the rocker outer reinforcement including a side wall portion, an upper wall portion and a lower wall portion;
   a front pillar that extends upward in a vertical direction of a vehicle from a front end portion of the rocket; and
   a gusset that is provided at a lower end portion of the front pillar, the gusset including a body wall portion, the vehicle width direction being coincident with a thickness direction of the body wall portion, the body wall portion being joined to the front pillar, the gusset including a bottom wall portion that is bent inward in the vehicle width direction at a lower end portion of the body wall portion, the bottom portion being joined to an upper face of the upper wall portion of the rocker reinforcement.

2. The vehicle side structure according to claim 1, wherein the bottom wall portion of the gusset is inclined downward in the vertical direction of the vehicle, as the bottom wall portion extends outward in the vehicle width direction in a front view of the vehicle.

3. The vehicle side structure according to claim 1, wherein an outer face of the body wall portion of the gusset in the vehicle width direction and an outer face of the side wall portion of the rocker outer reinforcement in the vehicle width direction are arranged in a same plane.

4. The vehicle side structure according to claim 1, wherein a front reinforcement member that reinforces the rocker outer reinforcement is provided inside the front end portion of the rocker, and
   the front reinforcement member supports a rear end portion of the bottom wall portion of the gusset together with the upper wall portion of the rocker outer reinforcement.

5. The vehicle side structure according to claim 4, wherein a corner portion that constitutes an angle portion of a door opening portion is formed at the lower end portion of the front pillar,
   a joint area joining the front pillar and the rocker to each other is set at a terminal end portion of the corner portion,
   a rear reinforcement member that reinforces the rocker outer reinforcement is provided inside the rocker, at a position rearward in the vehicle front-rear direction with respect to the front reinforcement member, and
   the rear reinforcement member is arranged downward in the vertical direction of the vehicle with respect to the joint area.

6. The vehicle side structure according to claim 5, wherein a region where the rocker and the front pillar are joined to each other serves as a joint portion in the joint area, and
   the rear reinforcement member is arranged rearward in the vehicle front-rear direction with respect to the joint portion.

7. The vehicle side structure according to claim 1, wherein a fragile portion that serves as a starting point of deformation in response to a rearward load in the vehicle front-rear direction is formed at a rear end portion of the body wall portion of the gusset.

8. The vehicle side structure according to claim 4, wherein the from reinforcement member connects the upper wall portion of the rocker outer reinforcement with the lower wall portion of the rocker outer reinforcement to each other.

9. The vehicle side structure according to claim 4, wherein the front reinforcement member is constituted of a pair of bulk members that are aligned with each other in the vehicle front-rear direction, and
   the rear end portion of the bottom wall portion of the gusset is arranged between the pair of the bulk members in a side view.

10. The vehicle side structure according to claim 6, wherein
    the joint portion of the joint area is arranged between the front reinforcement member and the rear reinforcement member in a side view.

11. The vehicle side structure according to claim 5, wherein
    an upper flange portion and a lower flange portion that extend rearward in the vehicle front-rear direction are formed on the front reinforcement member or the rear reinforcement member, and
    the upper flange portion and the lower flange portion are joined to the upper wall portion of the rocker outer reinforcement and the lower wall portion of the rocker outer reinforcement respectively.

12. The vehicle side structure according to claim 5, further comprising:
    an upper reinforcement member that extends in the vehicle front-rear direction, the upper reinforcement member being provided between the front reinforcement member and the upper wall portion of the rocker outer reinforcement, and the upper reinforcement member being provided between the rear reinforcement member and the upper wall portion of the rocker outer reinforcement.

13. The vehicle side structure according to claim 12, wherein the upper reinforcement member is formed in a shape of a long plate whose thickness direction is coincident with the vertical direction of the vehicle, and a bend portion that is bent downward in the vertical direction of the vehicle is formed at at least one of both end portions of the upper reinforcement member in the vehicle width direction.

* * * * *